Figure 1:
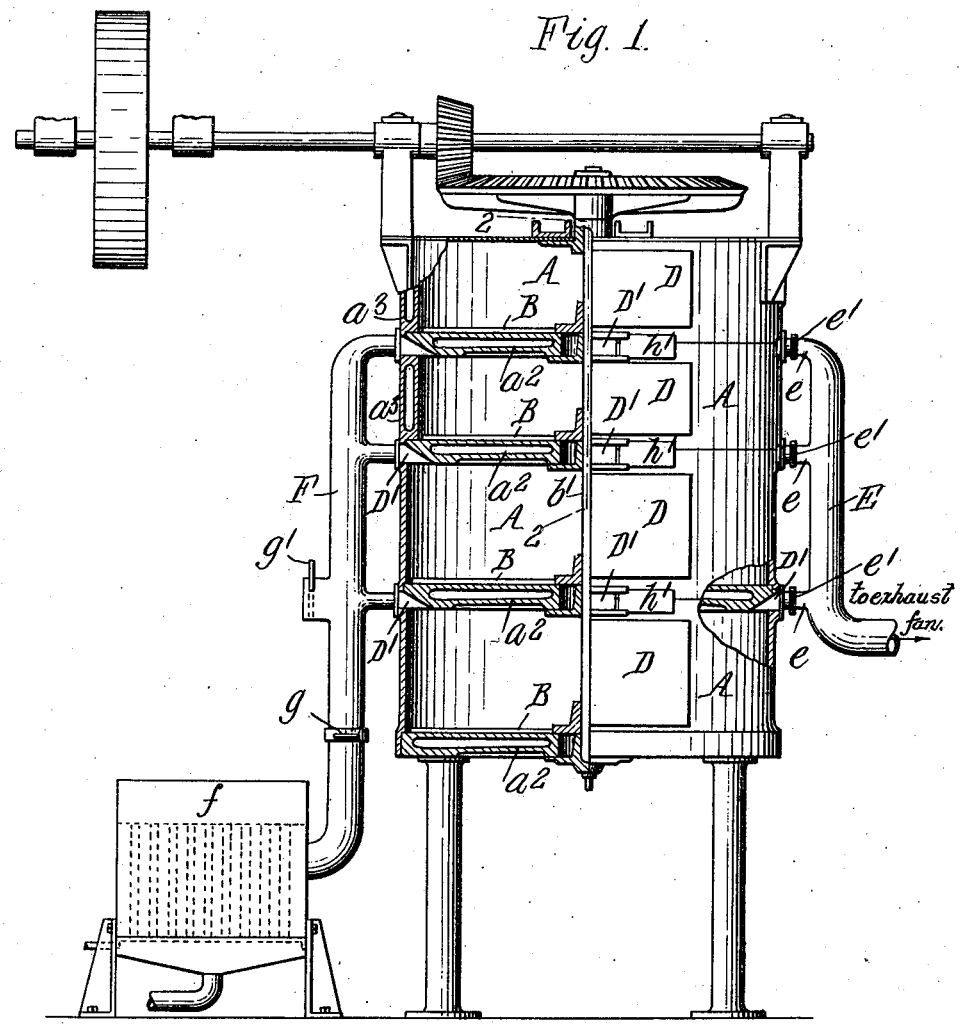

A. W. FRENCH.
APPARATUS FOR AND METHOD OF COOKING OIL BEARING MATERIAL.
APPLICATION FILED NOV. 17, 1908.

1,000,675. Patented Aug. 15, 1911.

Witnesses:
A. G. Dimond.
E. A. Tock.

Inventor.
A. W. French
By Wilhelm Parker Hurd
Attorneys.

UNITED STATES PATENT OFFICE.

ALFRED W. FRENCH, OF PIQUA, OHIO.

APPARATUS FOR AND METHOD OF COOKING OIL-BEARING MATERIAL.

1,000,675.  Specification of Letters Patent.  Patented Aug. 15, 1911.

Application filed November 17, 1908. Serial No. 463,101.

*To all whom it may concern:*

Be it known that I, ALFRED W. FRENCH, a citizen of the United States, residing at Piqua, in the county of Miami and State of Ohio, have invented a new and useful Improvement in Apparatus for and Methods of Cooking Oil-Bearing Material, of which the following is a specification.

This invention relates to apparatus for and an improved method of cooking oil-bearing meals preparatory to expressing the oil therefrom.

The apparatus and method herein described are primarily intended for cooking cotton seed but are not necessarily restricted to this particular purpose.

The cookers heretofore most commonly used in cotton seed mills consist of several kettles arranged in a horizontal series, and in the cooking operation the kettles have been filled and emptied alternately, the meal remaining in the kettles until cooked and then being discharged through conveyers, and, in some cases, through a subkettle, into the cake former. With this type of cooker the meal is usually cooked for a short period of time with steam at a relatively high pressure, which results in the meal becoming quickly heated practically to the boiling point of water, after which the high temperature acts to drive off the moisture contained in the meal, necessitating the addition of water if the seed is dry. This turns the meal dark and adds color to the oil, which increases the loss in refining. Great care is required in cooking the meal to prevent damage to the resulting product by leaving the meal too long a time in the kettles and to cook the charges in the different kettles alike. If the meal is left too green or wet, it will creep in the press and injure the press cloths, while, on the other hand, if sufficient moisture is not left in the meal to make a firm, compact cake, there will be a loss of oil. Thus the services of an experienced meal cook are required night and day. Furthermore, considerable labor is entailed in filling and discharging the kettles, and the kettles require a large amount of floor space in the mill. There are also cookers, used almost exclusively in linseed mills, in which the kettles are arranged one over the other and separated by intervening spaces, or in a stepped or staggered series, so that the tops of the kettles can be left open for the escape of the moisture driven off from the meal, but these arrangements require considerable vertical and floor space. Neither of these types of cookers has provision for properly regulating the moisture of the cooked meal and the meal cannot be kept in the kettles for a sufficiently long time to be properly cooked at a moderate heat without seriously reducing the output of the mill.

The objects of this invention are to produce an improved cooking apparatus for oil bearing meals in which the several kettles can be arranged one directly over and upon the other, thereby enabling the apparatus to be set up in a very much smaller space, provision being made for carrying off the moisture as required according to the condition of the meal; and to provide an improved continuous method of cooking oil-bearing meal in which all of the meal can be uniformly cooked and the moisture thereof regulated as required, and the meal maintained in the cooker for a long period of time at a moderate heat whereby the services of an experienced meal cook are dispensed with, the quality of the product, both the oil and the oil cake, is improved, the yield of oil is increased, and the injury to the press cloths is reduced.

Figure 2:
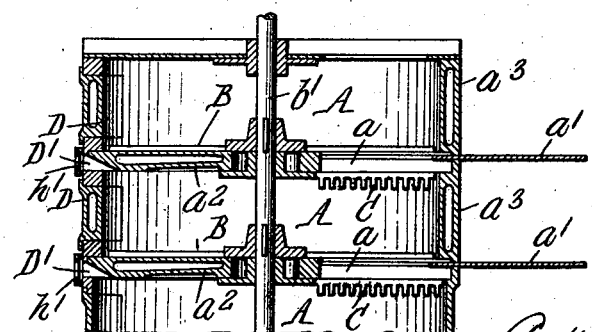

In the accompanying drawings: Figure 1 is an elevation, partly in section, of a steam cooker embodying the invention and intended for carrying out the improved process of cooking meal. Fig. 2 is a fragmentary sectional elevation thereof, in line 2—2, Fig. 1.

Like letters of reference refer to like parts in both figures.

A represents steam cooking kettles or chambers which are preferably arranged one directly over and upon the other, so that the bottom of one kettle forms the top of the one next below. The kettles have bottom discharge openings $a$, controlled by sliding or other suitable gates $a'$, through which the meal can flow by gravity from kettle to kettle and can be drawn from the bottom kettle. Any suitable number of kettles may be employed. In the cooker illustrated there are four kettles, all having hollow bottoms $a^2$, forming steam chambers which are supplied with steam by the usual or any suitable means (not shown) for cooking or heating the meal. The two upper kettles are preferably shallower than the others and are provided with hollow or jacketed walls $a^3$ also supplied with steam for the purpose of quickly heating the meal therein to the required temperature.

B represents the usual rotary stirrers or scrapers which consist of arms that project horizontally from a suitably driven central vertical shaft $b'$ and scrape the bottoms of the kettles, keeping the meal in motion so as to prevent it from being scorched, and cause it to pass readily through the discharge openings $a$.

The meal is fed automatically to the top kettle and discharges by gravity from each kettle to the one next below, and means are provided which operate automatically in such manner that the kettles are kept but partially filled, and whenever meal is drawn from the bottom kettle into the cake former, a corresponding quantity of meal is caused to be delivered into the bottom kettle from the next kettle above, and in like manner the discharge of meal from each kettle causes a corresponding quantity of meal to be delivered thereto from the kettle next above. Thus the quantity of meal in each kettle is kept substantially constant, and as the meal is delivered into the top and discharged from the bottom of each kettle without being mixed, it descends through the series of kettles in layers, and a definite period of time, depending upon the rate at which the meal is drawn from the bottom kettle, is required for any particular batch of meal to pass through the cooker, so that by drawing the meal from the bottom kettle at regular intervals, all of the meal is uniformly cooked. The means shown for this purpose are the same as disclosed in my application Serial No. 428,857, filed April 23, 1908, from which this case is divided, and consist of dams or baffles C, one of which depends into the upper portion of each kettle at one side of the discharge opening of the next kettle above. When the meal rises in the kettles substantially to the level of the lower edges of the dams therein, each dam, as more fully explained in my said application, causes the meal to pile up under the discharge opening of the kettle above and prevents the discharge of meal therefrom until the level of the meal in the kettles is lowered by drawing meal from the bottom kettle. The quantity of meal in each kettle except the first is thus kept substantially uniform and an air space is always maintained between the meal in one kettle and the bottom of the kettle next above. Other suitable means may be employed for this purpose, such, for example, as disclosed in Patent No. 909,773, granted January 12, 1909, to M. W. Faherty, assignor to myself.

A large covered man-hole D is provided in the side of each kettle to afford access thereto. Vent holes D' are provided in the upper portion of each kettle or chamber for the escape of the moisture rising from the meal, the holes for each kettle being conveniently formed by recesses in the edges of the bottom of the next kettle above. An exhaust trunk E, connected by branches $e$ with the vent holes at one side of the cooker, leads to an exhaust fan (not shown) for drawing off the moisture from the kettles. Dampers $e'$ in the branches $e$ of the exhaust pipe enable the suction from the several kettles to be controlled for the purpose of drawing off more or less moisture, according to the condition of the meal.

F represents a hot air supply pipe connecting the vent holes at one side of the cooker with an air heater $f$ of any suitable kind. The hot air pipe is provided with a damper $g$ and with a cold air inlet opening controlled by a damper $g'$. By properly adjusting these dampers the air can be tempered as required.

The vent holes D' which do not connect with the suction and hot air pipes are preferably provided with gates or valves $h'$ of any suitable sort for partially or wholly closing them. These holes are sufficiently large and numerous to allow the escape of moisture from the meal when it is relatively dry, but when the vapor driven off from the meal cannot escape naturally through the vent holes D' the valves for the holes between the exhaust and hot air pipes are closed to prevent the admission of cold air, which condenses the moisture and chills the meal, and the vapor is drawn off through the exhaust trunk E. When the meal is very wet, hot air from the pipe F is drawn through the kettles by the exhauster for more rapidly drying the meal, the temperature of the air being regulated according to the condition of the meal, by proper adjustments of the dampers $g$ and $g'$. The air is heated to such a temperature that it will not condense the vapor in the kettles. When the seed is dry the vent holes D' can be closed so that the natural moisture in the meal may be retained. Thus the moisture can be prevented from escaping from the kettles when this is necessary on account of the meal being dry, and the meal can be dried more or less, as required, by the proper use of the exhausting and hot air supplying means. Vent holes between the air supply and exhaust pipes are not absolutely essential and, if desired, the moisture can be removed and the hot air supplied by a forced draft instead of by exhaustion.

The described means for maintaining the air spaces in the kettles above the meal and for carrying off the moisture, besides enabling the regulation of the moisture of the meal as stated, enables the kettles to be placed directly over and upon each other, which obviates the necessity for the large spaces between the kettles heretofore required when the kettles were arranged in a descending series for the escape of the moisture. The height of the cooker is, therefore, greatly reduced and of course the cooker requires only the floor space necessary for a single kettle in the horizontal arrangement.

In the cooking process the meal passes in succession from one kettle to the next, the time required for the passage of every portion of meal being substantially the same. The meal is subjected both at the bottom and the sides to the steam heat in the two upper kettles, and the bottom of the top kettle also heats the top portion of the meal in the second kettle, so that as the quantity of meal in these two kettles is relatively small the meal is quickly raised to the necessary cooking temperature in the first two kettles. The steam pressure on the other kettles need be only sufficient to retain the meal at the temperature given it in the two upper kettles so as to retain the heat in the meal and allow it to cook practically by its own heat. As the lower kettles are of larger capacity than the upper ones, it requires longer for each portion of meal to pass through these kettles, and the meal is therefore cooked slowly in these kettles at a moderate heat for a longer time than it can be kept in the greater heat of the upper kettles, which results in thoroughly softening the oil cells of the meal so that they will more readily give up their oil under pressure, without either driving off the necessary moisture or scorching or discoloring the meal. The long slow cooking of the meal also coagulates the albumen in the meal so that the meal will not creep in the press and burst the press cloths, as it does when cooked more rapidly.

While the described arrangement of the kettles, one vertically over and directly upon the other, is preferred for the reasons stated, yet the described continuous process of cooking can be carried out with other arrangements of the kettles so long as they are disposed in a descending series and have provision for regulating the quantity of meal therein, as stated.

I claim as my invention:

1. The combination of a plurality of closed cooking kettles or chambers for solid material arranged in a descending series, means for heating said kettles to cook the material, means for automatically regulating the quantity of material in said kettles to prevent the material from rising in the kettles to the tops thereof, and means for admitting air to the upper portions of at least a part of said kettles at one side thereof and drawing the air from said kettles at a distance from the air inlets whereby the air passes across the material in said kettles and the moisture is removed therefrom, substantially as set forth.

2. The combination of a plurality of closed cooking kettles or chambers for solid material arranged in a descending series, means for heating said kettles to cook the material, means for automatically regulating the quantity of material in said kettles to prevent the material from rising in the kettles to the tops thereof, and means for circulating dry air over the material in at least a part of said kettles to carry off the moisture from the material, substantially as set forth.

3. The combination of a plurality of closed cooking kettles or chambers for solid material arranged in a descending series, means for heating said kettles to cook the material, means for automatically regulating the quantity of material in said kettles to prevent the material from rising in the kettles to the tops thereof, means for exhausting air from the upper portions of at least a part of said kettles, and means for supplying air thereto and regulating the temperature of said air, substantially as set forth.

4. The combination of a plurality of steam cooking kettles or chambers for solid material arranged one directly over and upon the other and having discharge openings so that each kettle can discharge into the one next below, means for automatically controlling the discharge of material from one kettle to another to regulate the quantity of material in said kettles and prevent the material from rising in the kettles to the tops thereof, air admission openings in the upper portions of at least a part of said kettles, and suction means connected to the upper portions of said kettles at points distant from said air admission openings, substantially as set forth.

5. The combination of a plurality of heating kettles or chambers for solid material having bottom discharge openings arranged for the material to discharge from one kettle to the kettle next below, and means which operate automatically to regulate the discharge of material from the several kettles except the lowest in accordance with the discharge from said lowest kettle, one or more of the lower kettles being of larger capacity than the kettle or kettles above the same, said lower kettles being heated to a lower temperature than the others, substantially as set forth.

6. The herein described continuous process of cooking oil-bearing material, consisting in heating the material in a series of kettles and causing a quantity of the material to pass from one kettle to the next accordingly as the material is drawn from the last kettle, and causing a current of air to pass through at least a portion of said kettles over the material therein for regulating the moisture of the material, substantially as set forth.

7. The herein described continuous process of cooking oil-bearing material, consisting in heating the material in a series of closed kettles and causing a quantity of the material to pass from one kettle to the next accordingly as the material is drawn from the last kettle, and circulating heated air over the material in at least a portion of said kettles to regulate the moisture of the material, substantially as set forth.

8. The herein described continuous process of cooking oil-bearing material, consisting in heating the material in a series of kettles and causing a quantity of the material to pass from one kettle to the next accordingly as the material is drawn from the last kettle, bringing the material to the required temperature for cooking in the first one or more of the kettles, and maintaining larger quantities of the material in the last one or more of the kettles than in the first kettles at a heat such as to retain the temperature imparted to the material in said first kettles, substantially as set forth.

9. The herein described continuous process of cooking oil-bearing material, consisting in heating the material in closed kettles arranged in a descending series so that material is discharged from each kettle to the next lower one in the series accordingly as the material is drawn from the last kettle, preventing the material from rising in the kettles to the tops thereof, and causing a current of air to pass through at least a portion of said kettles over the material therein for regulating the moisture of the material, substantially as set forth.

10. The herein described continuous process of cooking oil-bearing material, consisting in heating the material in closed kettles arranged in a descending series so that material is discharged from each kettle to the next lower one in the series accordingly as the material is drawn from the last kettle, preventing the material from rising in the kettles to the tops thereof, exhausting from the upper portions of at least a part of the kettles the moisture driven off from the material, supplying air to said kettles, and regulating the temperature of the air supplied, substantially as set forth.

Witness my hand, this 14 day of November, 1908.

ALFRED W. FRENCH.

Witnesses:
C. B. JAMISON,
ROSE TALBOT.